United States Patent [19]

Itoh et al.

[11] Patent Number: 4,677,563

[45] Date of Patent: Jun. 30, 1987

[54] AUTOMOTIVE NAVIGATION SYSTEM

[75] Inventors: Hisatsugu Itoh; Kousaku Uota, both of Himeji, Japan

[73] Assignee: Mitsubishi Denki Kabushiki Kaisha, Japan

[21] Appl. No.: 725,741

[22] Filed: Apr. 22, 1985

[30] Foreign Application Priority Data

Apr. 27, 1984 [JP]  Japan .................................. 59-86809

[51] Int. Cl.$^4$ ............................................. G06F 15/50
[52] U.S. Cl. .................................... 364/449; 364/521; 340/988; 340/995; 73/178 R
[58] Field of Search ............... 364/443, 449, 460, 521; 340/988, 995; 343/451; 73/178 R; 342/451

[56] References Cited

U.S. PATENT DOCUMENTS

| | | | |
|---|---|---|---|
| 4,513,377 | 4/1985 | Hasebe et al. | 364/521 |
| 4,535,335 | 8/1985 | Tagami et al. | 340/995 |
| 4,543,572 | 9/1985 | Tanaka et al. | 340/995 |
| 4,571,684 | 2/1986 | Takanabe et al. | 340/995 |

FOREIGN PATENT DOCUMENTS 146814  9/1983  Japan .

OTHER PUBLICATIONS

"Cathode-Ray Tube Information with Automotive Navigation", by M. W. Jarvis and R. C. Berry.
"On-Board Computer System for Navigation, Orientation, and Route Optimization", by Haeussermann.

*Primary Examiner*—Gary Chin
*Attorney, Agent, or Firm*—Leydig, Voit & Mayer

[57] ABSTRACT

An automotive navigation system wherein a memory included therein has not stored therein picture information of an actual map but instead has stored therein geographical names and the geographical positions thereof. When the geographical names of the departure point and the destination point are entered through an input unit, a control unit reads out from the memory the respective graphical names and the positional information thereof. A display device displays marks indicating the departure point, the destination point, and the current position of a vehicle on an adequately reduced scale on the display screen. Furthermore, a display control is carried out such that the mark indicating the current position of the vehicle does not extend beyond the display screen during the running of the vehicle.

6 Claims, 24 Drawing Figures

FIG. 5
"Kana" TABLE

| | 41a1 | 41a2 | 41a3 | 41a4 | 415 | DEFINITION OF SOUND |
|---|---|---|---|---|---|---|
| 41a | A | I | U | E | O | CLEAR SOUND |
| 41b | KA | KI | KU | KE | KO | CLEAR SOUND |
| 41c | SA | SHI | SU | SE | SO | CLEAR SOUND |
| 41d | TA | CHI | TSU | TE | TO | CLEAR SOUND |
| 41e | NA | NI | NU | NE | NO | CLEAR SOUND |
| 41f | HA | HI | FU | HE | HO | CLEAR SOUND |
| 41g | MA | MI | MU | ME | MO | CLEAR SOUND |
| 41h | YA | | YU | | YO | CLEAR SOUND |
| 41i | RA | RI | RU | RE | RO | CLEAR SOUND |
| 41j | WA | | | | | CLEAR SOUND |
| 41ℓ | (GA) | (GI) | (GU) | (GE) | (GO) | VOICED SOUND |
| 41m | ZA | JI | ZU | ZE | ZO | VOICED SOUND |
| 41n | DA | JI | ZU | DE | DO | VOICED SOUND |
| 41o | BA | BI | BU | BE | BO | VOICED SOUND |
| 41p | PA | PI | PU | PE | PO | SEMI-VOICED SOUND |
| 41q | KYA | | KYU | | KYO | CONTRACTED SOUND |
| 41r | SHA | | SHU | SHE | SHO | CONTRACTED SOUND |
| 41s | CHA | | CHU | CHE | CHO | CONTRACTED SOUND |
| 41t | NYA | | NYU | | NYO | CONTRACTED SOUND |
| 41u | HYA | | HYU / FYU | | HYO | CONTRACTED SOUND |
| 41v | MYA | | MYU | | MYO | CONTRACTED SOUND |
| 41w | RYA | | RYU | | RYO | CONTRACTED SOUND |
| 41x | GYA | | GYU | | GYO | VOICED CONTRACTED SOUND |
| 41y | JA | | JU | JE | JO | VOICED CONTRACTED SOUND |
| 41z | BYA | | BYU | | BYO | VOICED CONTRACTED SOUND |
| 41zz | PYA | | PYU | | PYO | SEMI-VOICED CONTRACTED SOUND |
| 41k | N | | | | | |

AUTOMOTIVE NAVIGATION SYSTEM

BACKGROUND OF THE INVENTION

This invention relates to an automotive navigation system, and in particular to an automotive navigation system wherein a departure point, a destination point, and the current point of a vehicle are displayed with respective marks on a display such as a cathode ray tube.

Such an automotive navigation system has been already proposed in Japanese Patent Application Laid-open No. 58-146814. This conventional system detects the running distance and the heading of a vehicle and computes the current position of the vehicle from those information. This system also displays picture information of a map read out from a memory on the disply such as a CRT while displaying the mark indicating the current position of the vehicle which is computed on the display, whereby a driver can determine the current position of the vehicle from the map and the mark imaged on the display.

However, since the picture information in a map to be displayed is extremely numerous in regards to the amount of information therein, the quantity of information stored must be restricted so that it can be stored in a small-sized and cheap memory suitable for a vehicle. In a case where the departure point and the destination point are predetermined, even though a map stored in the memory is displayed on the display and a mark indicating the current position of the vehicle is displayed in a superposed manner, a change in the current position may often be limited to a very small portion of the screen of the display. Furthermore, if the distance between the departure point and the destination point is far so as to require a plurality of maps, it is hard to grasp the entire running route.

Although it is not necessarily impossible to solve these technical problems with a memory having a large capacity as well as a high speed arithmetic device, the size of the whole system becomes very large so that it is difficult to mount the same on the vehicle.

On the other hand, there have been disclosed, "Cathode-Ray Tube Information Center with Automotive Navigation" published in SAE Technical Paper Series 840313 by M. W. Jarvis and R. C. Berry, and "On-Board Computer System for Navigation, Orientation, and Route Optimization" published in SAE Technical Paper Series 840485 by P. Haeussermann. Both publications are based on International Congress & Exposition held in Detroit, Michigan on Feb. 27-Mar. 2, 1984. In the former literature, an approximate position of a vehicle is determined from the communication with a satellite, and a more accurate position is determined and displayed on the CRT by means of a self-contained navigation using an earth magnetism sensor in the vehicle. The latter literature discloses a composite system of a route guide system in trunk (main) highways using distance information and a destination indicating system within a city using distance information and heading information.

SUMMARY OF THE INVENTION

It is accordingly an object of the present invention to provide an automotive navigation system wherein a memory included therein has not stored therein picture information of an actual map, but instead has stored therein geographical names and the geographical positions thereof. When the geographical names of the departure point and the destination point are entered through an input unit, a control unit reads out from the memory the respective graphical names and the positional information thereof. A display means displays marks indicating the departure point, the destination point and the current position of a vehicle of an adequately reduced scale on the display screen. Furthermore, a display control is carried out such that the mark indicating the current position of the vehicle does not extend beyond the display screen during the running of the vehicle. This arrangement of an automotive navigation system can perform a fully practical navigation function even with a small sized cheap memory and arithmetic unit.

In order to accomplish this object, an automotive navigation system according to this invention, broadly, comprises a running distance detecting means for detecting the running distance of a vehicle; a vehicle heading detecting means for detecting the heading of the vehicle; a display means for enabling a planar display based on the two dimensional Cartesian coordinates system; a storage means for storing information comprising a geographical name and the positional information thereof; and for each of a plurality of points a control means for designating the geographical names of a departure point and a destination point reading out the positional information from the storage means of the designated geographical names inputting signals from the running distance sensor and the heading sensor, computing the current position of the vehicle on the basis of the signals, computing coordinates on the display means of marks indicative of the departure point, the destination point, and the current position of the vehicle on the basis of their mutual positional relationship and in a reduced scale determined by said departure point, said destination point, and the current position of the vehicle so that said marks do not extend beyond said display means while the vehicle is being driven, and causing the display means to display said marks indicative of the departure point, the destination point and the current position of the vehicle in the reduced scale at the corresponding computed coordinates.

The control means comprises a current position computing means for computing the current position of the vehicle from the running distance detected by the running distance detecting means and the vehicle heading detected by the vehicle heading detecting means; a current position initializing means for initializing the current position of the vehicle for the current position computing means; a point setting means for entering the geographical names of the departure point and the destination point of the vehicle, for retrieving the geographical names from the storage means, for reading out the positional information corresponding to the geographical names, and for setting the positional information as the positions of the points; and a mark displaying control means for determining the distance and the positional relationship between the departure and destination points from the positional information of both points set by the point setting means, for computing coordinates on the display means of the marks indicative of the departure point, the destination point, and the current position of the vehicle on the basis of the mutual positional relationship and the reduced scale, and for causing the display means to display the marks respectively indicative of the positions of the departure and destination points the current position of the vehicle at the coordinates on the display means.

The mark displaying control means preferably includes means for causing the display means to display the marks of the departure point and the destination point on the outer periphery of a rectangular zone as imaginarily provided on the screen of the display means.

Furthermore, the mark displaying control means may comprise means for determining the distance and the positional relationship between the departure and destination points from the positional information of both points set by the point setting means, means for causing the display means to display the marks respectively representative of the positions of both points based on the determined distance and positional relationship therebetween and to display, on the reduced scale determined by the marks, a mark representative of the current position of the vehicle on the display means, means for computing coordinates on the display means of marks indicative of the departure point, the destination point, and the current position of the vehicle on the basis of the mutual positional relationship and said reduced scale, said computing means including, means for determining the maximum and minimum values of the positional information of the departure and destination points and the current position of the vehicle, determining the middle point between the maximum and minimum values, and converting the positional information and the current position to the coordinate system so that the display means displays two of the marks on the outer periphery of the rectangular zone and displays the remaining one of the marks within the rectangular zone. The above means for converting the coordinate system comprises means for determining the reduced scale determined by the comparing the ratio of a lateral length of the predetermined zone to the difference between a first set of maximum and the minimum values with the ratio of a longitudinal length of the predetermined zone to the difference between a second set of maximum and the minimum values The positional information for each of the plurality of points may comprise information representative of the Longitude and the Latitude of the point.

BRIEF DESCRIPTION OF THE DRAWINGS

The present invention will be readily apparent from the embodiments illustrated in the accompanying drawings in which:

FIG. 9A shows a main flow chart of the program executed by a control circuit shown in FIG. 2, and FIGS. 9B–9J respectively show detailed flow charts of the subroutines of the main flow chart in FIG. 9A; and, FIGS. 10A–10F respectively show displayed examples indicating marks of departure and destination points as well as a vehicle's position.

Throughout the figures, the same reference numerals indicate indentical or corresponding portions.

DETAILED DESCRIPTION OF THE PREFERRED EMBODIMENTS

Figure 1:
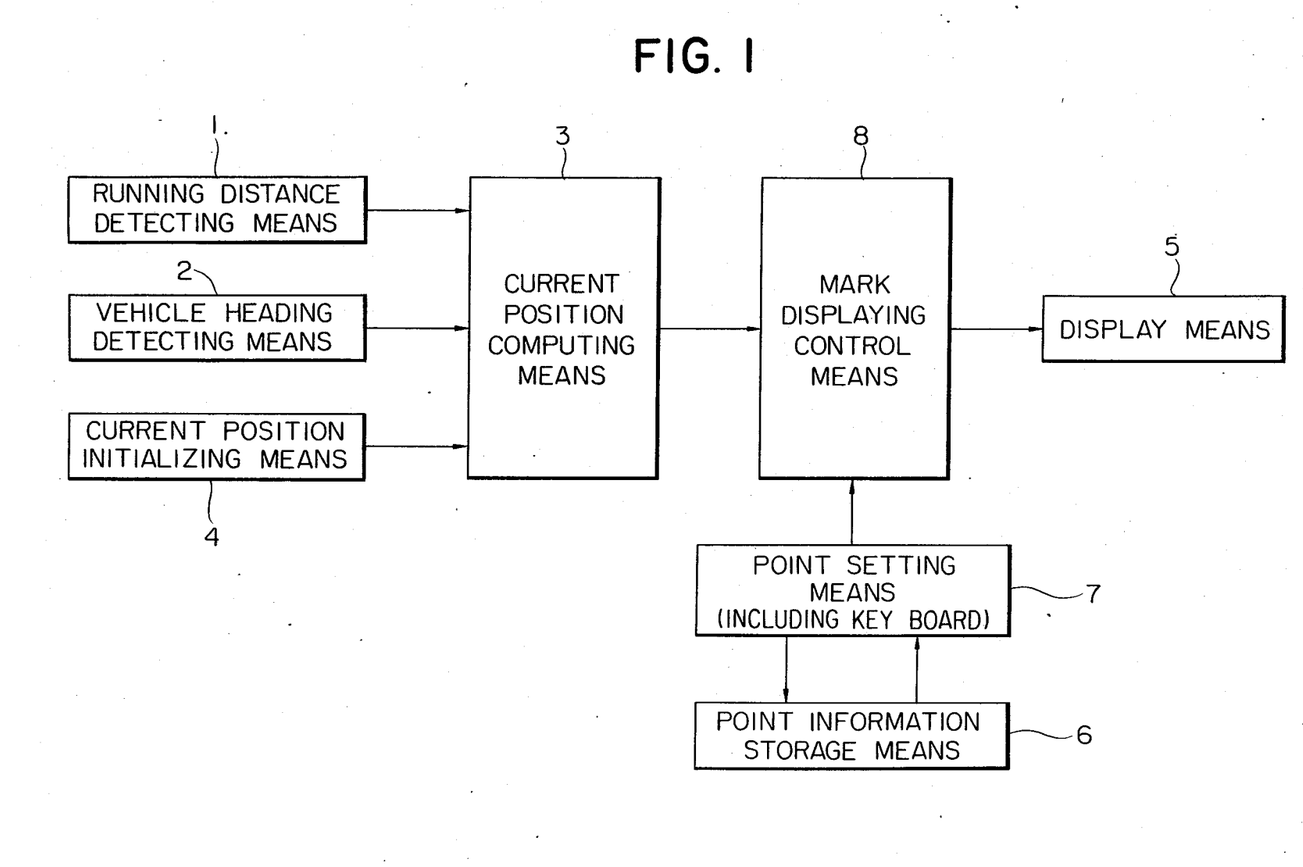
FIG. 1 shows a functional block diagram of a basic arrangement of an automotive navigation system in accordance with this invention.

Referring now to the drawings, in particular FIG. 1, there is shown one embodiment of an automotive navigation system according to this invention. This embodiment schematically shows a functional block diagram of this invention. In the figure, the outputs of a detection means 1 for detecting the running distance of a vehicle, and a detection means 2 for detecting the heading of the vehicle are connected to the inputs of a computing means 3 for computing the current position of the vehicle from the running distance provided by the detection means 1 and the heading provided by the detection means 2. An initializing means 4 is provided for initially setting the current position of the vehicle for the computing means 3. A display means 5 is able to make a planar display and a character display on the two-dimensional Cartesian coordinates. A point information storage means 6 has stored therein information representative of a plurality of points each point consisting of the geographical name information and the position information thereof. The point information storage means 6 is interconnected to a point setting means 7 which includes as key board 23 for entering names representative of a departure point and a destination point, namely designates the respective geographical names of a departure point and a destination point of the vehicle, reads out respective positional information corresponding to the entered geographical names from the storage means 6, and sets the positional information read out, accordingly to the coordinates of the geographical names. The outputs of the point setting means 7 together with the current position computing means 3 are connected to the inputs of a mark displaying control means 8 whose output is connected to the input of the display means 5. On the basis of the positional relationship of the departure and the destination points entered by the setting means 7, the mark displaying control means 8 causes the display means 5 to display marks representative of the positions of both of the points on the screen of the display means 5 at predetermined positions thereof on the basis of a reduced scale determined by both points. The mark displaying control means 8 further causes the display means 5 to display a mark indicative of the current position of the vehicle on the screen of the display means. While the vehicle is being driven, the mark displaying control means 8 computes the coordinates of the departure point and the destination point and the current position of the vehicle on the screen on the basis of the positional relationship between them and the marks are controlled so that the mark representative of the current position of the vehicle does not go out of a predetermined zone on the screen while the vehicle is being driven. Therefore, the marks are displayed at the corresponding coordinates on the screen. As a result, it becomes possible to determine the approximate position of the vehicle while driving, from the positional relationship of the mark indicative of the departure point, the destination point, and the current position of the vehicle displayed on the screen.

Figure 2:
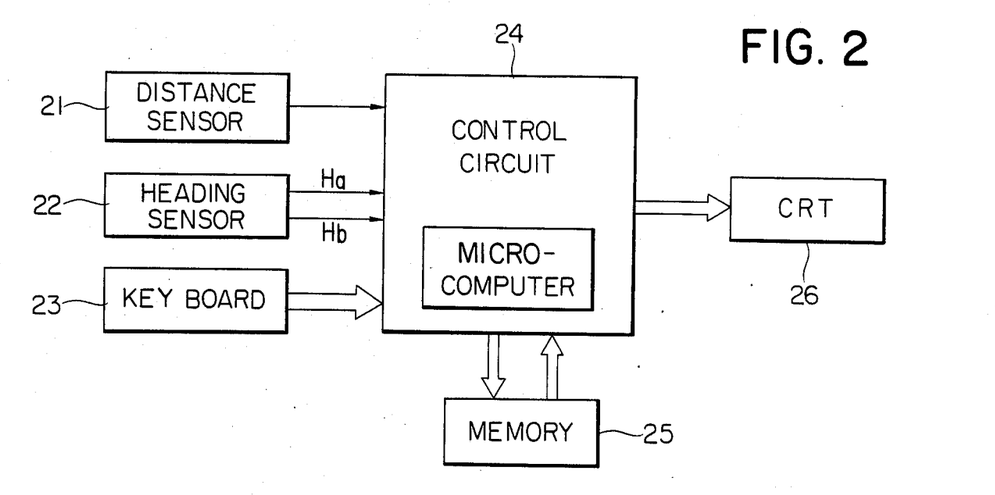
FIG. 2 shows a hardware block diagram corresponding to the arrangement of FIG. 1.
Figure 3:
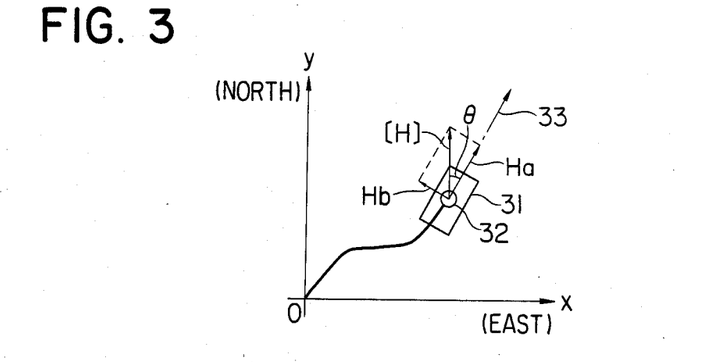
FIG. 3 shows a graph for explaining a heading direction sensor used in FIG. 2.

The functional arrangement of this invention shown in FIG. 1 is specifically shown in FIG. 2 in the form of hardware. It is seen from FIG. 2 that the hardware of this invention is formed of a running distance sensor 21, a vehicle heading sensor 22, a key board 23, a control circuit 24, a semiconductor memory 25 and a CRT 26. The distance sensor 21 detects the rotational speed of a vehicle wheel by means such as an electromagnetic pickup or a reed switch, whereby the frequency of the generated pulses are proportional to the rotational speed of the vehicle wheel. The heading sensor 22 detects the earth magnetism [H] (vector) being decomposed into a heading component Ha and the normal component Hb, as shown in FIG. 3, which is perpendicular to Ha by means such as an earth magnetism detector 32 of a flux-gate type which is fixed on the vehicle 301, and outputs a signal corresponding to the detected magnetism to the control circuit 24.

Figure 4:
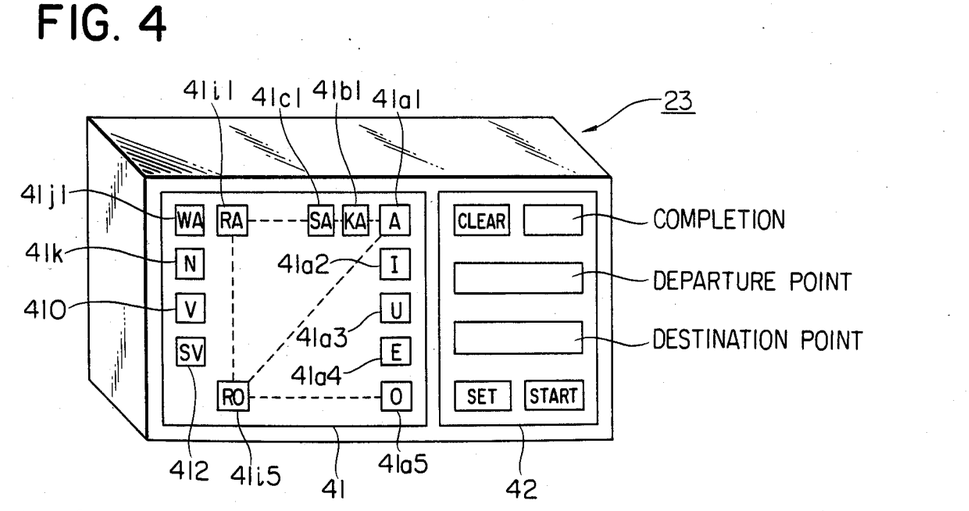
FIG. 4 shows an exterior view of a keyboard used in FIG. 2.

As illustrated in FIG. 4, the key board 23 includes a character key portion 41 and a control key portion 42. The character key portion 41 consists of character keys representative of the "A" to "N" Japanese alphabet called "Kana", which have been represented and will be hereinafter represented by capital letters for convenience's sake, as well as a voiced sound key represented by "V" and a semi-voiced sound key represented by "SV" which utitized in combination with the character keys to generate the remaining kana characters as shown in table in FIG. 5. The control key group 42 consists of control keys indicative of "CLEAR", "COMPLETION", "DEPARTURE POINT", "DESTINATION POINT", "SET", and "START" functions.

Figure 5:
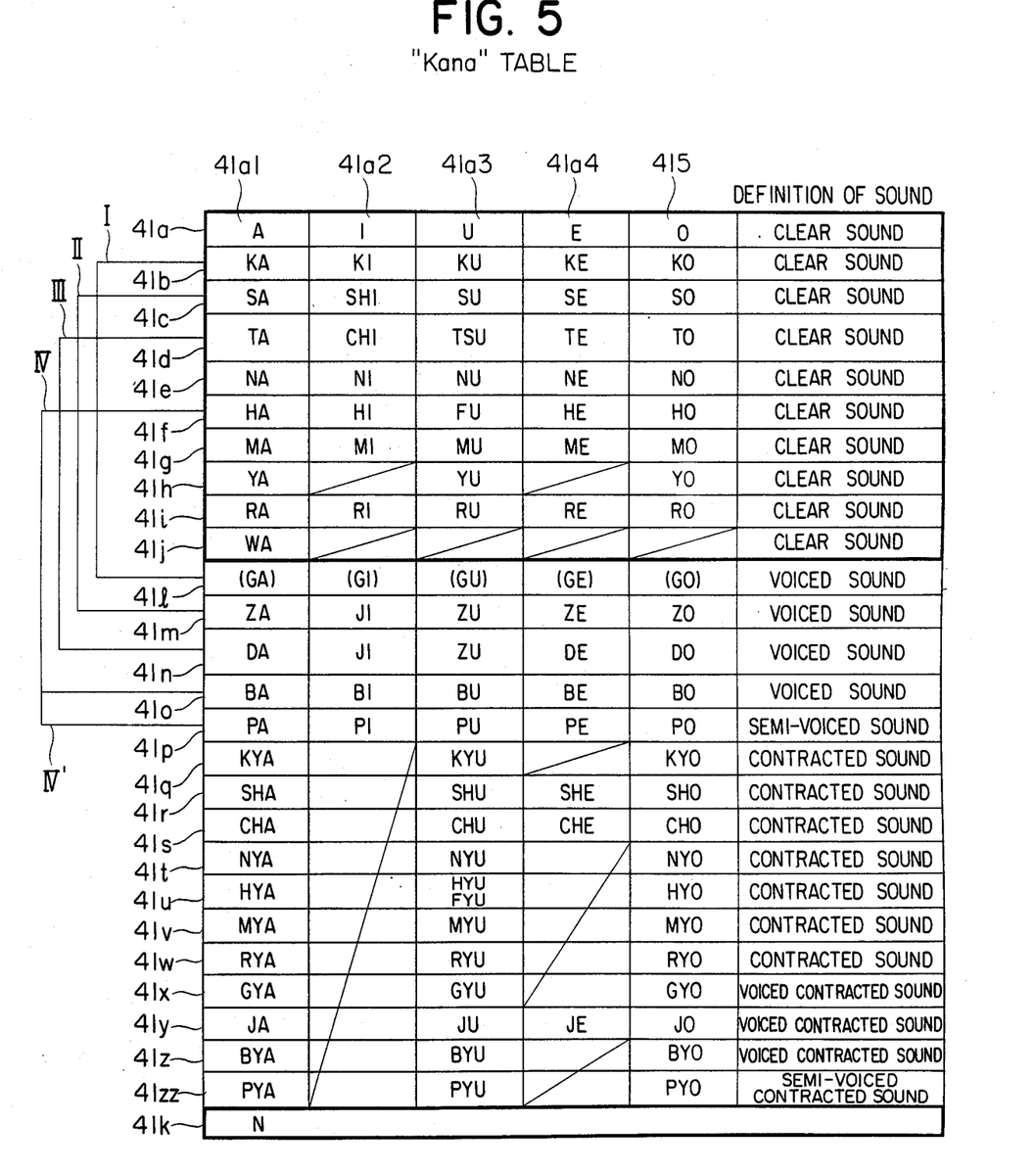
FIG. 5 shows a table of Japanese "Kana" alphabet.

As illustrated in FIG. 5, the character key board 41 is utilized to input all syllables known as "Kana" characters representative of all the syllables utilized in speaking Japanese.

A Japanese "Kana" Table (alphabet) is shown in FIG. 5 in which all the Kana characters are represented by Roman characters. Specifically, the table comprises 44 CLEAR SOUND Kana characters from A to WA enclosed with a thick line in which rows 41a–41j are respectively called "A" row, "KA" row, "SA" row, "TA" row, "NA" row, "HA" row, "MA" row, "YA" row, "RA" row and "WA" row, respectively, an "N" SOUND Kana character shown in row 41k and enclosed with a thick line, VOICE SOUND Kana characters shown in rows 41m–41o, SEMI-VOICED SOUND Kana characters shown in row 41p, CONTRACTED SOUND characters shown in rows 41q–41w, VOICED CONTRACTED SOUND Kana characters shown in rows 41y–41z and SEMI-VOICED CONTRACTED SOUND characters shown in row 41zz.

Next, the manner of inputting these Kana characters into the system using the keys 41 will be described. Referring to FIG. 4, a first column of keys 41a1, 41a2, 41a3, 41a4, and 41a5 shown in FIG. 4 is utilized to enter the respective CLEAR SOUND Kana characters "A", "I", "U", "E" and "O" shown in row 41a in FIG. 5, a second column of keys represented by key 41b1 in FIG. 4 is utilized to enter the respective CLEAR SOUND Kana characters "KA", "KI", "KE", "KE", and "KO" show in row 41b, and so on for the remaining CLEAR SOUND Kana characters as represented in the Kana table shown in FIG. 5 by the keys 41cl–41k. Key 41jl represents the CLEAR SOUND Kana character "WA" while key 41k represents the Kana N. The key 410 is utilized in combination with the keys for generating the CLEAR SOUND characters to generate the VOICED SOUND characters. The key 412 is utilized in combination with the keys for generating the CLEAR SOUND Kana characters to generate the SEMI-VOICED SOUND Kana characters. For example, to generate the SEMI-VOICED SOUND PA, first the CLEAR SOUND key representitive of the Kana SOUND "HA" is pressed after which the key 412 is pressed, thereby changing the inputted sound from "HA" to "PA". Similarly, the SEMI-VOICED SOUND Kana characters "PI", "PU", "PE" and "PO" are inputted by first inputting the respective CLEAR SOUND Kana characters "HI", "FU", "HE" and "HO", and then pressing the key 412, respectively.

The VOICED SOUND Kana characters are inputted as follows. First a CLEAR SOUND KEY is pressed and then the key 410 is pressed. For example, to input the VOICED SOUND Kana character "GA", first the Kana character "KA" is inputted by pressing the corresponding CLEAR SOUND key, and then the key 410 is pressed to change the inputted Kana character from "KA" to "GA". Similarly, by pressing the key 410, inputted CLEAR SOUND Kana characters "KI", "KU", "KE" and "KO" can be changed to "GI", "GU", "GE", and "GO", the characters "SA", "SHI", "SU", "SE", and "SO" can be changed to "ZA", "JI", "ZU", "ZE" and "ZO", characters "TA", "CHI", "TSU", "TE" and "TO" can be changed to "DA", "JI", "ZU", "DE" and "DO", and characters "HA", "HI", "FU", "HE" and "HO" can be changed to "BA", "BI", "BU", "BE" and "BO", respectively.

The Kana "N" can be entered upon pressing the key 41k.

Next, the manner of entering the CONTRACTED SOUND Kana characters will be described. For example, for entering the city name Kyoto, the CONTRACTED SOUND Kana "KYO" and the CLEAR SOUND "TO" must be inputted. To insert the Kana "KYO", first the key representative of the Kana "KI" is pressed after which the key representative of the Kana "YO" is pressed. Next, the key representative of the Kana "TO" is pressed, thereby inputting the work "KIYOTO". If no city "KIYOTO" exists in the memory, the system will automatically display the city KYOTO, whereby the CLEAR SOUNDS "KI" and "YO" are automatically changed to the CONTACTED SOUND Kana "KYO". Similarly, all the other CONTRACTED SOUND Kana can be generated by inputting the closest combination of CLEAR SOUND Kana.

The lines I-IV shown in FIG. 5 joining the the CLEAR SOUND Kana rows to the VOICED SOUND Kana rows are indicative of the repspective transformations which occur to the respective Kana when the key 410 is pressed and the line IV' indicates the transformation which occurs when the key 412 is pressed after the respective CLEAR SOUND Kana have been entered.

The entry of kana character by the activation of a key of the character key portion 41 is read in the control circuit 24. The semiconductor memory 25 is composed of, for example, a ROM (Read Only Memory) which has stored therein point information consisting of geographical information (i.e. city names, town names, etc.) and the position information thereof. The stored information is read out by the control circuit 24.

Figure 6:
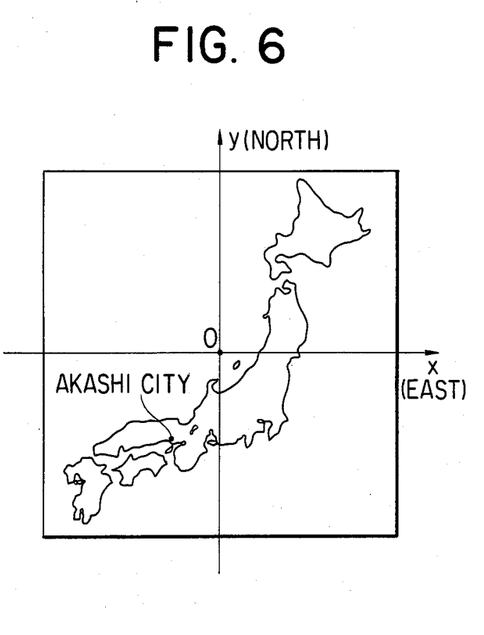
FIG. 6 shows a relationship between the map of Japan and the coordinates thereof.
Figure 7:
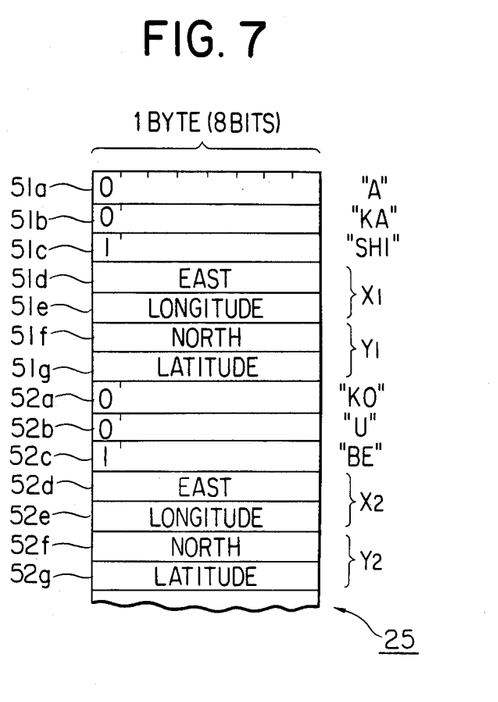
FIG. 7 shows a table of geographical point information stored in a semiconductor memory used in FIG. 2.

For example, the point information of the city hall of AKASHI (Akashi) City in Japan shown in FIG. 6 is stored in memories 51a–51g in a memory map of the semiconductor memory 25 illustrated in FIG. 7. In the memories 51a–51c, "AKASHI" as a geographical information is sequentially stored in the form of the codes respectively representative of the Japanese "Kana" characters "A", "KA", and "SHI". It is to be noted that each of the memories comprises 8 bits. The most significant bit of each of the memories 51a–51c serrves to indicate the information of a geographical name in which the memory 51c having stored therein the last character of the geographical name information is assigned "1" while the other memories 51a and 51b are assigned "0", as shown in FIG. 7. Therefore, the remaining seven bits of each of the memories 51a–51c represent a "Kana" character. With seven bits, it is possible to express all of the "Kana" characters having a clear sound, a voiced sound, a semi-voiced sound, a double sound, and a contracted sound, as illustrated in FIG. 5. The memories 51d–51g have stored therein the positional information of Akashi City in which, for example, the memories 51d and 51e serve to store the east longitude of Akashi City while the memories 51f and 51g serve to store the north latitude of Akashi City. Similarly, memories 52a–52g have stored therein the point information of "Kobe" for example.

To obtain the positional information, coordinate axes X and Y may be set for convenience's sake as shown by the map of Japan in FIG. 6 whereby coordinates (x, y) represeted by the relative distance on the basis of the coordinate axes may be stored. In this case, Japan is divided into 1700 Km squares in which this 1700 Km length is assigned 2 bytes (16 bits). Therefore, 1 bit is assigned about 26 m which results in a practical unit.

Meanwhile, there exist about 680 cities all over Japan while by preparing about 300 geographical names including the names of wards, towns, villages, interchanges, stations, castles, lakes, passes, mountains, and peaks per one prefecture, about 13,800 geographical names should be prepared in total for 46 divisions of Japan (including one Metropolitan District and 45 prefectures but not including Okinawa Prefecture). Supposing that the number of characters of a geographical name is five on the average, one point information requires 9 bytes (i.e. 5 bytes for a geographical name; 2 bytes for x coordinate (abscissa); 2 bytes for y coordinates (ordinate)) so that 124,200 bytes are required to store 13,800 points of Japan.

In order to store the information of 13,800 points, there are required four ROM's each of which has the maximum storage capacity of 256K bits as commercially available at present. However, with ROM of 1 M bit which is expected to be commercially available in the near future, only one ROM would be sufficient, in which a small-sized, light, and highly reliable semiconductor memory can be utilized.

Figure 8:
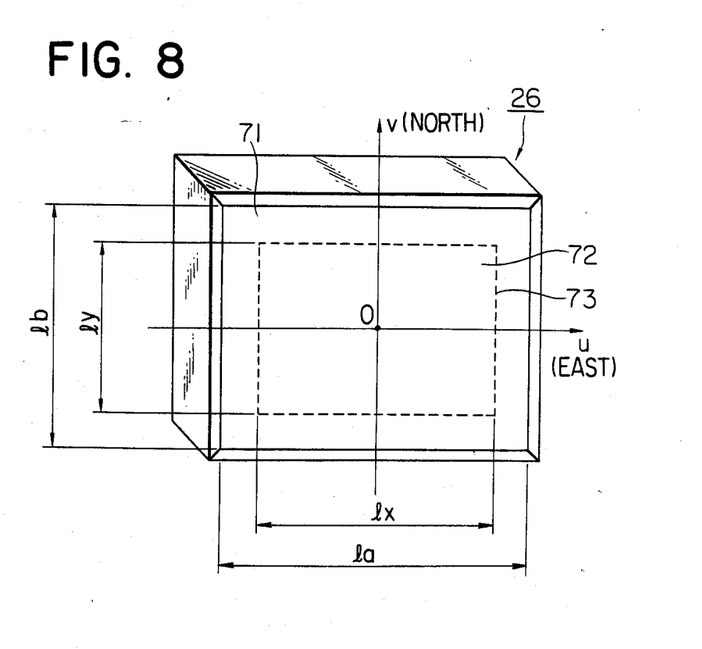
FIG. 8 shows a relationship between the screen of a cathode ray tube and the coordinates on the screen.

The CRT 26 may comprise a conventional one and is assumed to have a rectangular screen 71 as shown in FIG. 8. It should be noted that coordinate axes U and V are perpendicular to each other to indicate coordinates (u, v) in the screen 26a on which the marks of a departure point, a destination point, and the current position are to be indicated.

The control circuit 24 comprises a well known microcomputer system, and includes various I/O interface circuits (not shown). The control circuit 24 reads out the positional information from the semiconductor memory 25 on the basis of the information of a geographical name which is inputted by the operation of the key board 23, and causes the CRT 26 to display marks indicative of the points in an adequate reduced scale determined by considering the positional relationship between the departure point and the destination point. Furthermore, the control circuit 24 receives signals from the running distance sensor 21 and the heading sensor 22, computes the current position of the vehicle on the basis of said signals, and causes the CRT 26 to display a mark indicative of the current position of the vehicle in the predetermined reduced scale at the corresponding coordinates on the screen 71.

The operation of the control circuit 24 will then be described in detail with reference to flow charts illustrated in FIGS. 9A–9J.

Figures 9A, 9B:
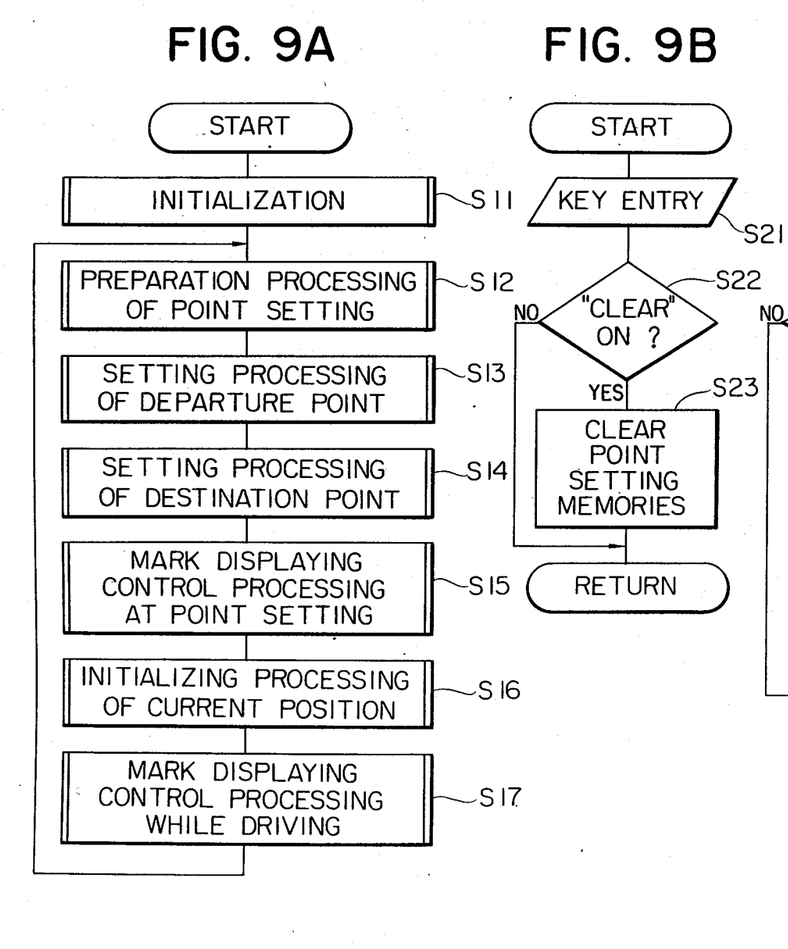

FIG. 9A illustrates the flow chart of a main routine of the program used for the control circuit 24. This general flow chart is started by an operation such as an electrical supply operation for the control circuit 24. At Step S11, variables are initialized, and then, a subroutine S12 for a preparation processing for setting points, a subroutine S13 for a setting processing of a departure point, a subroutine S14 for a setting processing of a destination point, a subroutine S15 for a mark displaying control processing at the time of setting the points, a subroutine S16 for an initializing processing of the current position, and a subroutine S17 for a mark displaying control processing while the vehicle is being driven are sequentially repeatedly executed.

Figure 9C:
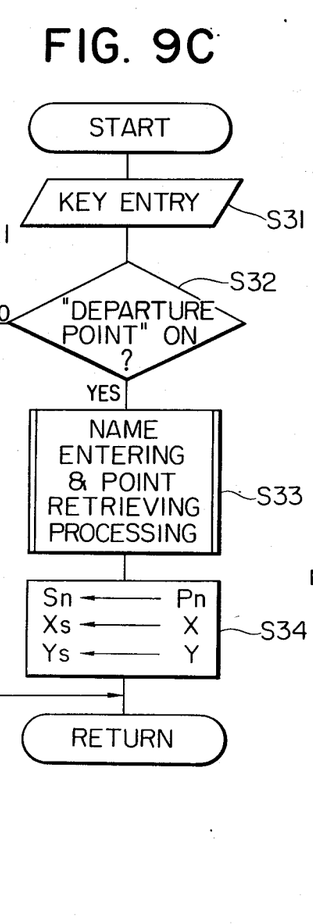
Figure 9D:
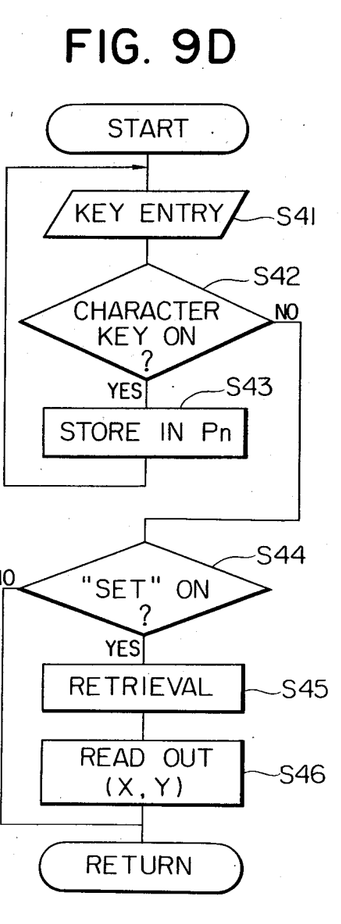

More specifically, an operator depresses the "CLEAR" key of the key board 23 before setting a departure point and a destination point. Consequently, in a flow chart of FIG. 9B illustrating the details of the subroutine S12 for the preparation processing of the point setting, the above depression of the key is detected at Steps S21 and S22, and then memories Pn, X, Y, Sn, Xs, Ys, Gn, Xg, and Yg (not shown), which will be described later, for setting respective points are cleared at Step S23. Then, a departure point is entered, that is, when for example, "Akashi City" is to be set, the "DEPARTURE POINT", "A", "KA", "SHI", and "SET" keys on the key boad 23 are sequentially depressed. Consequently, in a flow chart of FIG. 9C illustrating the details of the subroutine S13 for the setting processing of the departure point shown in FIG. 9A, the depression of the "DEPARTURE POINT" key is first detected at Steps S31 and S32 whereby a subroutine S33 for a geographical name entering and a point retrieving processings is executed. At Step S41 in a flow chart in FIG. 9D illustrating the details of the subroutine S33, the contents of the entered key are read in, and when the contents of the entered key are found to be characters at Step S42, they are stored in a memory Pn (n=1, 2,---) for storing the characters of geographical names. Every time a character key is depressed once, Steps S41 to S43 are executed so that "A" is stored in a memory P1, "KA" in a memory P2, and "SHI" in a memory P3, respectively, the memories P1-P3 not being shown. Finally, the depression of the "SET" key is detected at Steps S42 and S44, and at Step S45 the combination of the entered characters "A", "KA", and "SHI" is retrieved in the semiconductor memory 25 whereby a point information having the combination of the characters "A", "KA", and "SHI" stored in the memories 51a–51g is retrieved and at Step S46 the positional information of the point information stored in the memories 51d–51g is read out and the contents of the memories 51d and 51e are stored in the memory X while the contents of the memories 51f and 51g are stored in the memory Y.

Then, the program returns to Step S34 where the entered information of the geographical name in the memory Pn and the retrieved positional information in the memories X and Y are respectively transfered to the memories Sn (n=1, 2,---), Xs, and Ys for departure points. Hereby, the setting processing of the subroutine S12 of the departure point has been completed.

It is to be noted that the contents of the memories Sn (n=1, 2,---), Xs, and Ys respectively denote the geographical name of the departure point, the X coordinate value of the positional information of the departure point, and the Y coordinate value of the positional information of the departure point.

Figure 9E:
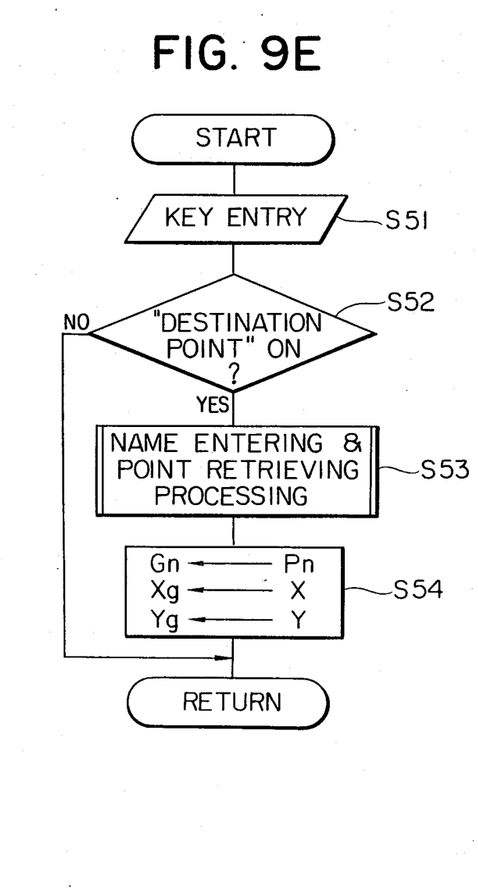

Next, a destination point is entered in the subroutine S13. When for example, city Kobe which is identical to Koube in Japanese is selected, the "DESTINATION POINT", "KO", "U", "HE", "V" keys (key 410), and "SET" on the key board 23 shown in FIG. 4 are sequentially depressed. Namely, in this case, the "DESTINATION POINT" key is depressed instead of the "DEPARTURE POINT" key in the case of the entry of the departure point as above mentioned. Then, the geographical name of the destination point is entered in the same manner as in the entry of the geographical name of the departure point. Consequently, the subroutine S14 for the setting processing of the destination point in FIG. 9A will be executed along a detailed flow chart, of the subroutine S14, shown in FIG. 9E. It is to be noted that Steps S51 and S53 are respectively the same as Steps S41 and S43 in the flow chart for the setting processing of the departure point illustrated in FIG. 9E, where at Step S52 it is determined whether or not the "DESTINATION POINT" key depressed while Step S42 determines whether or not the "DEPARTURE POINT" key is depressed, and Step S54 transfers the information of memories Pn, X, and Y respectively into the above mentioned memories Gn, Xg, and Yg while Step S44 transfers the information of the memories Pn, X, and Y respectively into the memories Sn, Xs, and Ys. Therefore, the process of FIG. 9E is similar to the process of FIG. 9C so that the detailed description thereof is omitted. It is to be noted that the contents of the memories Gn (n=1, 2 ---), Xg, and Yg respectively denote the geographical name of the departure point, the X coordinate value of the positional information of the destination point, and the Y coordinate value of the positional information of the destination point.

Since the settings of the departure point and the destination point has been thus processed, the operator depresses the "COMPLETION" key. Consequently, the subroutine S15 for the mark displaying control processing at the time of setting the points illustrated in FIG. 9A will be executed along a flow chart illustrated in FIG. 9F. In this flow chart, at Steps S61 and S62, the depression of the "COMPLETION" key is detected. Then, as will be described hereinafter, a reduced scale is determined such that marks respectively indicative of the departure point and the destination point may be displayed on the periphery 73 of a rectangular zone 72, having a lateral length of 1x and a longitudinal length of 1y, preliminarily imaginarily set on the screen 71 of the CRT 26 shown in FIG. 8.

Figure 9F:
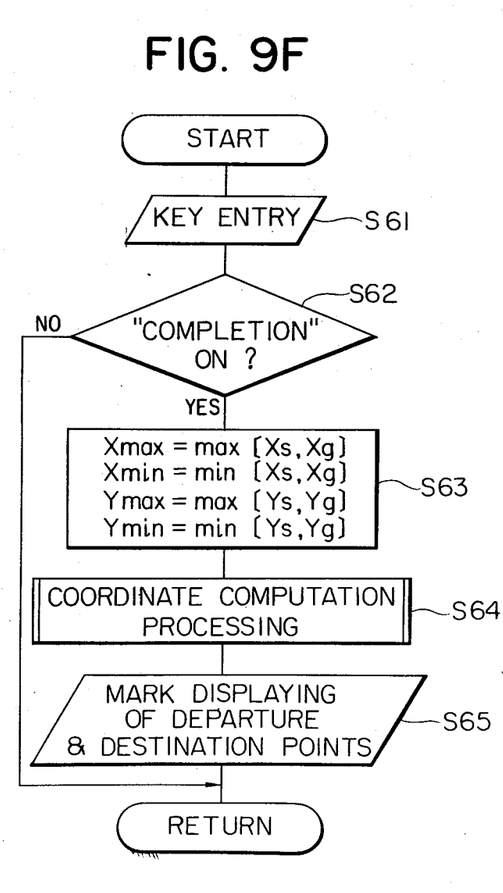

Namely, first of all, at Step S63, maximum values Xmax, Ymax and minimum values Xmin, Ymin are determined at every component (abiscissa, ordinate) of the coordinates respectively of the departure point and the destination point. Then, a subroutine S64 for the processing of the computation of the coordinates is executed along a flow chart illustrated in FIG. 9G. In this flow chart, at Step S71, the ratio of the lateral length 1x of the rectangular zone 72 of the screen 71 to a distance (Xmax−Xmin) in the lateral direction (from East to West) between the departure point and the destination point given by the maximum value Xmax and the minimum value Xmin of the abscissa X is determined as $rx = 1x/(Xmax - Xmin)$, and the ratio of the longitudinal length 1x of the rectangular zone 72 of the screen 71 to a distance (Ymax−Ymin) in the longitudinal direction (from North to South) between the departure point and the destination point given by the maximum value Ymax and the minimum value Ymin of the ordinate Y is determined as $ry = 1y(Ymax - Ymin)$. Then, at Step S72, the magnitudes of the above ratios rx and ry are compared. If $rx \leq ry$, rx is determined to be the reduced scale while if $rx > ry$, ry is determined to be the reduced scale (Steps S73, S74).

Figure 9G:
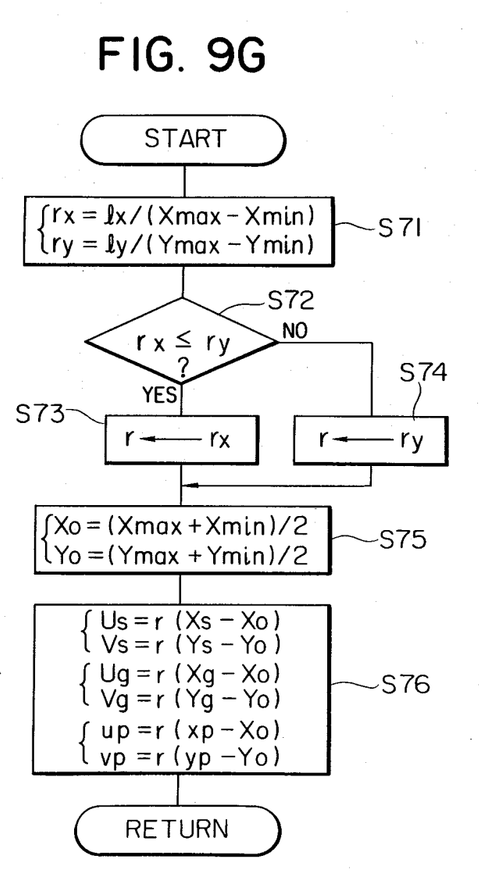
Figure 9H:
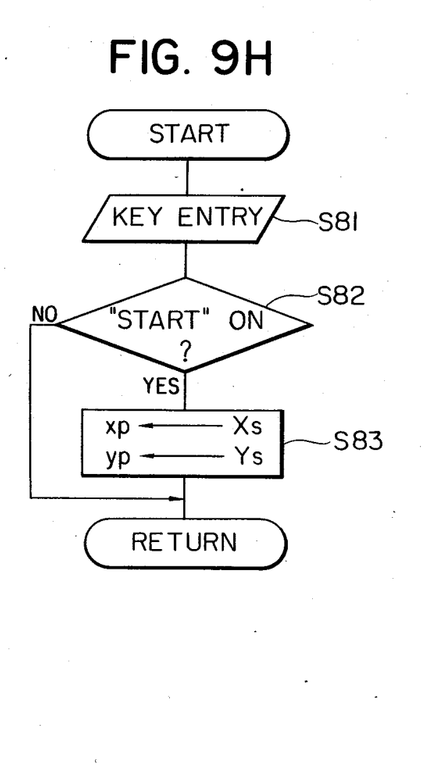

Then, at Step S75, the coordinates (Xo, Yo) of the middle point of the coordinate values Xmax, Ymax and Xmin, Ymin are calculated on the basis of the following equations:

$$\begin{cases} Xo = (X\text{max} + X\text{min})/2 \\ Yo = (Y\text{max} + Y\text{min})/2 \end{cases}$$

and in order that the middle point may correspond to the central point, i.e. the origin (u=0, v=0), of the rectangular zone 72, the conversion of the coordinates and the reduction of the reduced scale are calculated at Step S76 on the basis of the following equations:

$$\begin{cases} Us = r(Xs - Xo) \\ Vs = r(Ys - Yo) \end{cases}$$

$$\begin{cases} Ug = r(Xg - Xo) \\ Vg = r(Yg - Yo) \end{cases}$$

where the coordinate values Xs, Ys, Xg and Yg respectively indicate the contents of the memories Xs, Ys, Xg and Yg, and (Us, Vs) represents the coordinates of the departure point on the screen 71 while (Ug, Vg) represents the coordinates of the destination point on the screen 71, these coordinates being positioned on the outer periphery 73 of the rectangular zone 72. The calculation of the coordinates (up, vp) of the current position of the vehicle on the screen 71 after the vehicle has started has started will be described later referring to Step S76.

Figure 10A:
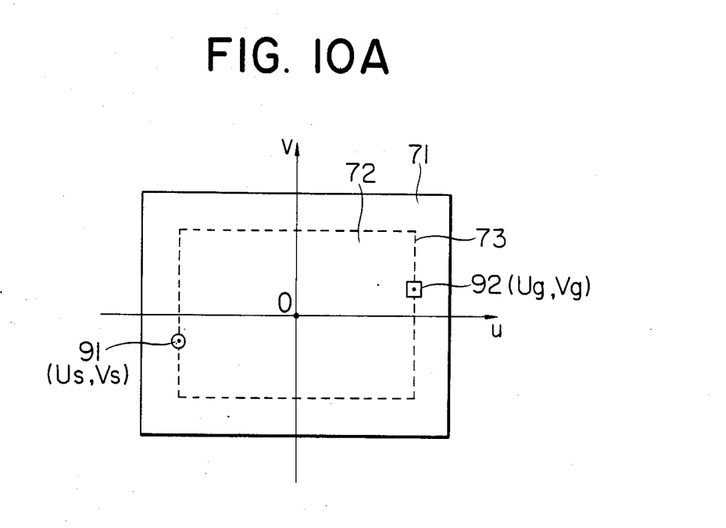

Thus, the execution of the subroutine S64 for the processing of the coordinate calculation has been completed, and the program proceeds to Step S65 in FIG. 9F in which a display signal is outputted to the CRT 26 from the control circuit 24 so that a mark 91 of the departure point and a mark 92 of the destination point may be displayed on the screen 71, shown in FIG. 10A, at the calculated coordinates (Us, Vs) and (Ug, Vg) respectively of the departure point and the destination point. Thus, the execution of the subroutine S15 of FIG. 9A has been completed.

When the vehicle is positioned at the departure point set, the operator may immediately depress the "START" key on the key board 23. If the vehicle is positioned a little far from the coordinates of the departure point, the operator may depress the "START" key when the vehicle has reached the coordinates (Xs, Ys) of the departure point. According to this, the subroutine S16 for the initializing processing of the current position of the vehicle illustrated in FIG. 9A will be executed along a flow chart illustrated in FIG. 9H. In this flow chart, at Steps S81 and S82, the depression of the "START" key is detected, and then at Step S83 the coordinates (Xs, Ys) of the departure point are set in memories "xp" and "yp" (not shown), for the coordinates of the current position of the vehicle, used for an integral computation of the current position of the vehicle.

Figure 9I:
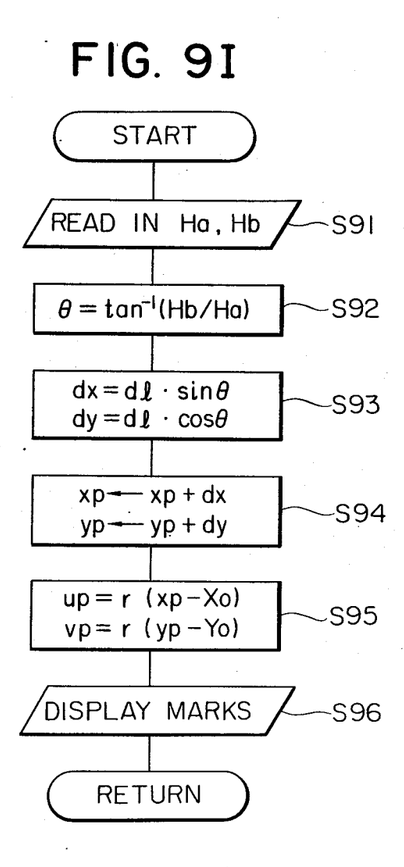

Thus, with the settings of the departure point, the destination point, and the current position of the vehicle having been completed and with the vehicle being continuously driven, an interrupt command is inputted to the micro-computer of the control circuit 24 each time the running distance sensor 21 generates a pulse at an interval of a unit running distance d1 (for example, 1 m), thereby executing an interrupt processing shown in FIG. 9I.

In the flow chart of the FIG. 9I, heading signals Ha and Hb are inputted to the micro-computer of the control circuit 24 at Step S91, and an angle $\theta$ derived from the earth magnetism [H] (vector) shown in FIG. 3 and the vehicle's heading 33 is calculated at Step S92 from the following equation:

$\theta = \tan^{-1}(Hb/Ha)$

Figure 10B:
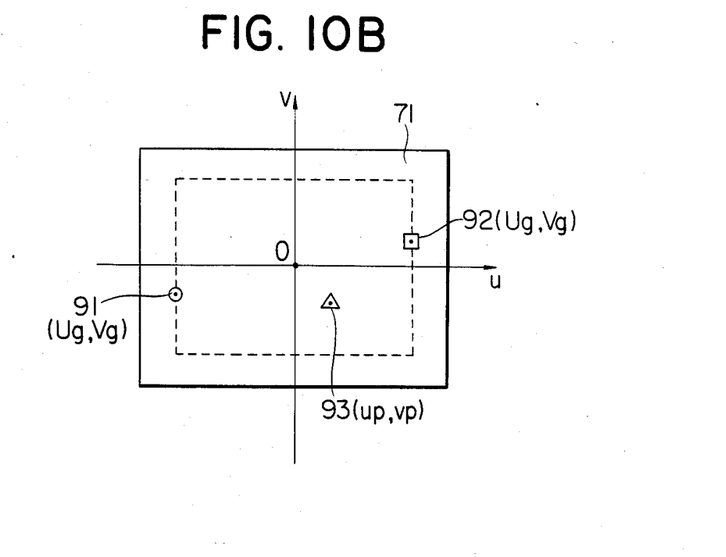

Then, at Steps 93 heading components dx and dy of the unit running distance d1 with respect to the coordinate axes X and Y shown in FIG. 6 are calculated according to the following equations:

$dx = d1 \sin \theta$ $dy = d1 \cos \theta$ and at S94, are added to the values integrated so far in the memories xp and yp of the coordinate components of the current position of the vehicle. Then, at Step S95, the coordinates (up, vp) of the current position of the vehicle on the screen 71 are calculated according to the following equations:

$up = r(xp - Xo)$ $vp = r(yp - Yo)$ on the basis of the reduced scale r, and then at Step S96, a display signal is outputted from the control circuit 24 to the CRT 26 so that a mark indicative of the current position of the vehicle may be displayed as shown in FIG. 10B at the coordinates (up, vp).

Figure 10C:
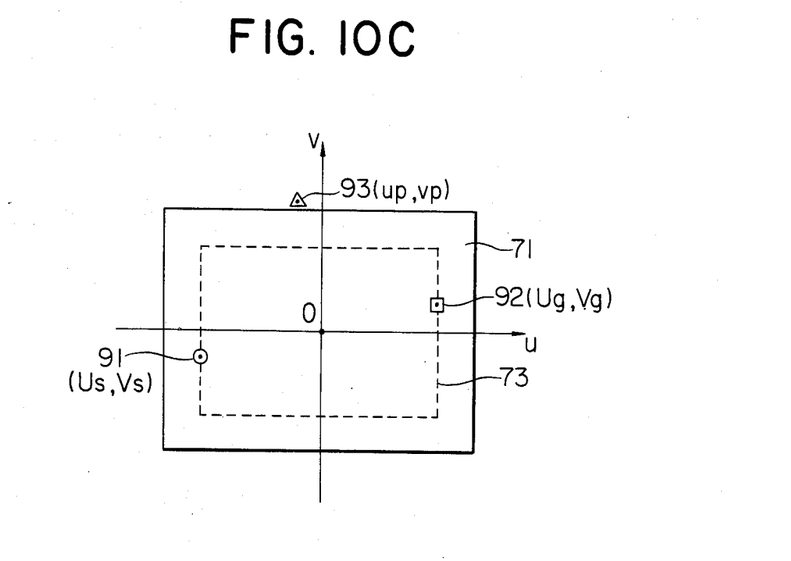

Meanwhile, if the vehicle detours and largely deviates from the shortest course connecting departure point and the destination point owing to the condition of roads and/or the operator's circumstances, there is such a possibility that the current position of the vehicle completely deviates from the screen 71 as shown by the mark indicative of the current position of the vehicle in FIG. 10C. Even for such a case, the present invention can display the mark of the current position of the vehicle without deviating from the screen 71 as will be described in the followings.

Figure 9J:
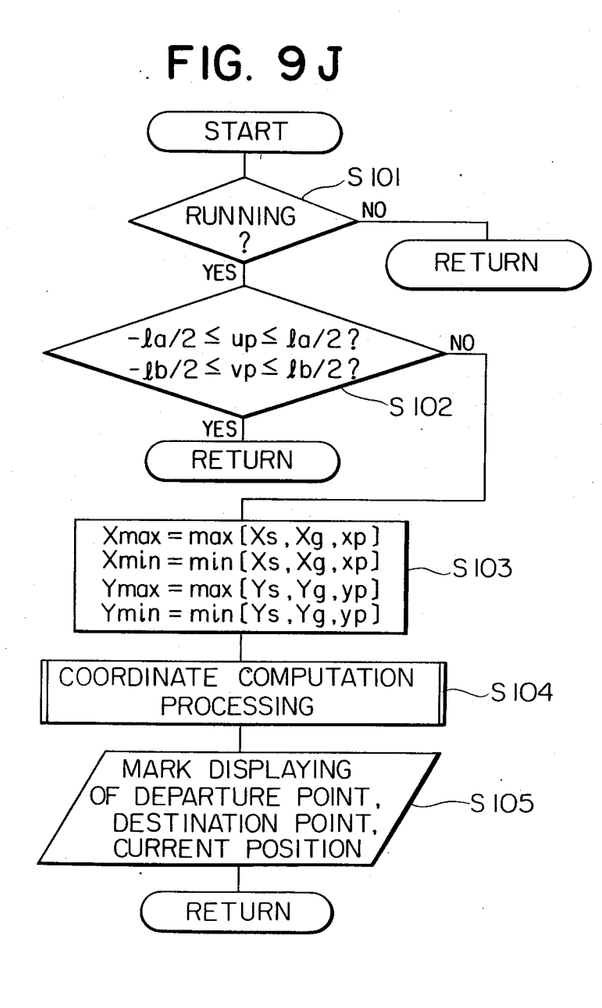

In FIG. 9J showing a flow chart of the subroutine S17 for the mark displaying control processing while running illustrated in FIG. 9A, whether or not the vehicle is running is first determined at Step S101. This determination can be carried out based on the vehicle's speed obtained by measuring the period of the output signal of the running distance sensor 21. Then, at Step S102, it is determined whether or not the mark 93 indicative of the current position of the vehicle has deviated from the screen 71. For example, assuming that the lateral length of the screen 71 be "1a" and the longitudinal length of the screen 71 be "1b", if it is found at Step S102 that both of the following conditions of $-1a/2 \leq up \leq 1a/2$, and $-1b/2 \leq vp \leq 1b/2$ are not fulfilled, that is that the vehicle is now out of the screen 71, the coordinates of the marks on the screen 71 will be calculated as indicated below. First of all, the maximum coordinate values Xmax and Ymax, and the minimum coordinate values Xmin and Ymin are determined, at Step S103, for every coordinate components (abscissa, ordinate) from the coordinates (Xs, Ys), (Xg, Yg), and (xp, yp) respectively of the departure point, the destination point, and the current position of the vehicle. Taking a positional relationship shown in FIG. 10C for example, $Xmax = Xg$ $Xmin = Xs$ $Ymax = yp$ $Ymin = Ys$ are given. Then, the subroutine S104 for the computation processing of coordinates is executed. While this subroutine S104 has generally the same processes as the subroutine S64 in FIG. 9F, the calculation of the coordinates of the current position of the vehicle as above noted with reference to Step S76 in FIG. 9G is performed on the basis of the following equations:

$up = r(xp - Xo)$ $vp = r(yp - Yo)$

Figure 10D:
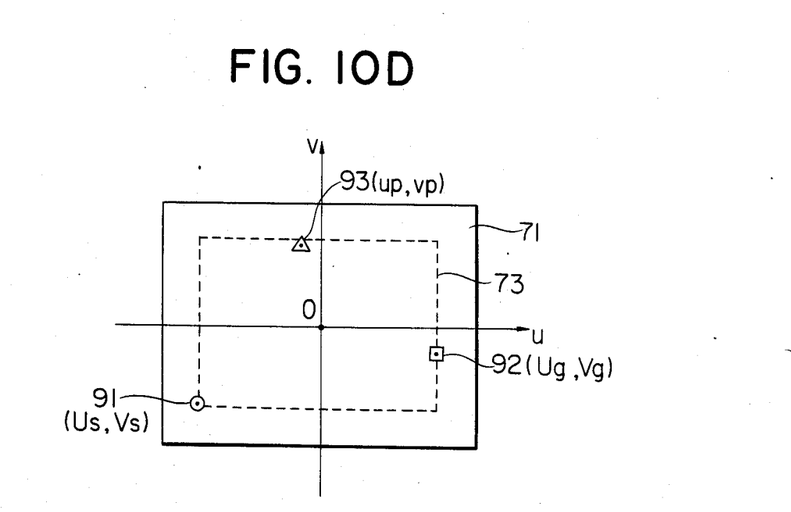

After this calculation of the coordinates at the subroutine S104, the program returns to Step S105 where a signal is outputted from the control circuit 24 to the CRT display 26 to display the marks 91-93 at the updated coordinates (Us, Vs), (Ug, Vg), and (up, vp) on the screen 71 respectively of the departure point, the destination point, and the current position of the vehicle, as shown in FIG. 10D. It should be noted that while the above processing has altered the coordinates (Xo, Yo) of the middle point between the coordinate values Xmax, Ymax and Xmin, Ymin, the positional relationship between the marks gives rx < ry and Step S73 is executed, so that the reduced scale r is not altered. An example of altering the reduced scale will be described later.

Figure 10E:
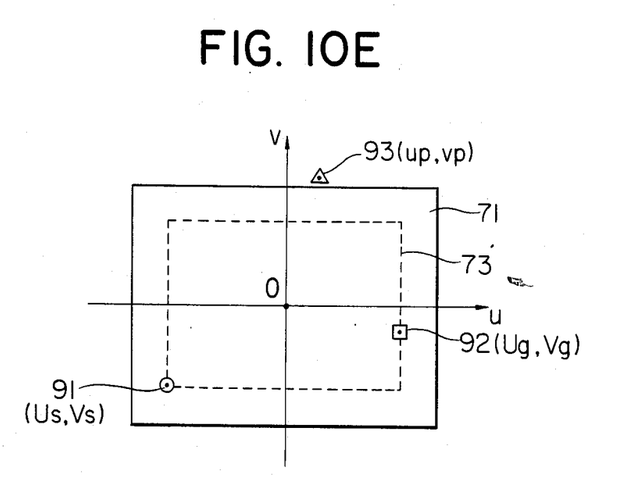
Figure 10F:
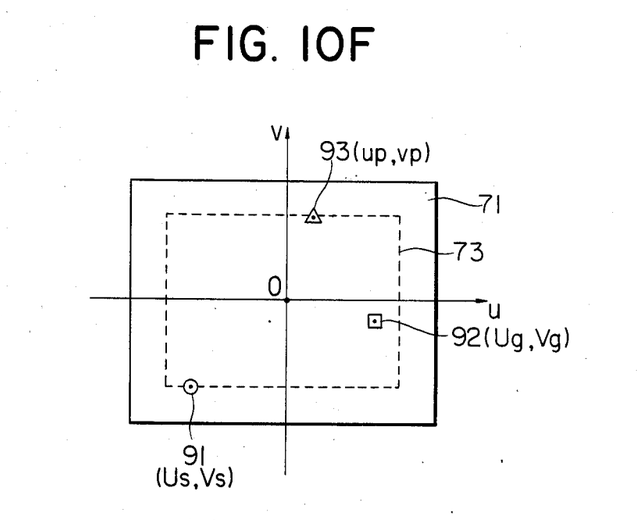

When the condition of FIG. 10D is about to change to the condition of FIG. 10E while the vehicle is continuously being driven, Steps S103 and S105 in FIG. 9J are executed again. Also in this execution, the maximum values Xmax, Ymax, and the minimum values Xmin, Ymin for the coordinate components (abscissa, ordinate) are the same as those obtained in FIG. 10D, as seen from the positional relationship between the marks shown in FIG. 10E, namely, $Xmax = Xg$ $Xmin = Ys$ $Ymax = yp$ $Ymin = Ys$ It is to be noted that while FIG. 10C is drawn with U-V coordinate system, the coordinates (Us, Vs), (Ug, Vg) and (up, vp) respectively correspond to the coordinates (Xs, Ys), (Xg, Yg) and (xp, yp) before the conversion of coordinates. As a result of the calculation at Step S71 in FIG. 9G, if it is found that rx>ry, the reduced scale "r" is altered to "ry" at Step S74. Also, the coordinates (Xo, Yo) of the middle point of the coordinate values Xmax, Ymax, Xmin, and Ymin are updated, resulting in a displaying state for the marks as shown in FIG. 10F.

Thus, while the vehicle is being driven, the subroutine S17 in FIG. 9A is repeatedly executed, whereby before the mark 93 indicative of the current position of the vehicle deviates from the screen 71, the reduced scale "r" and the coordinates (Xo, Yo) of the middle point are re-calculated. Therefore, the respective coordinates of the marks are calculated again for the display so that the operator does not have to carry out any other operations and can devote his energy to driving the vehicle.

It should be noted that while a display control of preventing the mark 93 indicative of the current position of the vehicle from deviating from the screen 71 has been described in the above embodiment, it is also readily possible to prevent the mark from deviating from a predetermined zone of the screen 71. For example, a zone having an outer periphery between the outermost periphery (lateral length 1a; longitudinal length 1b) of the screen 71 and the rectangular zone 72 may be set, and the determining inequalities of $-1x/2 + d1 \leq up \leq 1x/2 + d1,$ and $-1y/2 + d2 \leq vp \leq 1y/2 + d2$ (where $1x/2 < d1 < 1a/2$ and $1y/2 < d2 < 1b/2$) may be substituted for the equations of Step S102 in FIG. 9J whereby if the above equations are not fulfilled, then the calculation of the coordinates of the marks may be performed.

As above described, when the geographical names of the departure point and the destination point are entered, the control circuit 24 reads out the positional information of the points from among a set of pre-stored point information, sets the positional information as the coordinates of the departure point and the destination point, causes the CRT 26 to display the both points as marks in an adequately reduced scale and to continuously display, as a mark, the current position of the vehicle which is continuously computed and updated, and carries out a display control, while computing the coordinates of the marks, so that the mark indicative of the current position of the vehicle may not deviate from a predetermined zone of the screen of the CRT, whereby an on-board navigation function extremely suitable for an automobile is realized as follows:

(1) The picture information of an actual map is not stored in the semi-conductor memory 25 but instead point information consisting of the information of geographical names and the positional information of the respective names is stored as a basic unit whereby information of the points over a wide range of areas can be stored.

(2) Since the departure point and the destination point are designated by their geographical names and the positional information previously stored is read out and set as the coordinates of the points, the positions of the points can be accurately set with easy operations.

(3) Since the marks 91 and 92 indicative of the points are displayed on adequate positions of the screen 71 on the basis of the distance between the departure point and the destination point and the positional relationship therebetween and the mark 93 indicative of the current position of the vehicle is displayed on a reduced scale determined by the marks 91 and 92 where the coordinates of the marks 91–93 are being computed so that the mark 93 may not deviate from the predetermined zone of the screen while driving, the operator can exclusively apply his energy to driving the vehicle without requiring cumbersome operations such as the settings of positions and the reduced scale of the marks 91–93, and the alteration of them while driving.

It is to be noted that while the above embodiments of this invention has dealt with a semiconductor memory such as a ROM as a point information storage means, if a storage of a large capacity such as a floppy disc is used, then more positional information can be stored. Also, a voice input device may be substituted for a key board. Furthermore, a liquid crystal display device of a dot matrix type may be substituted for the CRT.

As above described, the automotive navigation system according to this invention can store point information over a wide range of zones and satisfy the condition that a small-sized and cheap device with an excellent practical operability be on board.

It is to be noted that while the present invention has been described with reference to the above embodiments illustrated in the accompanying drawings, it should not be limited thereto and may be applied with various modifications thereof without departing from the spirit of the invention.

What we claim is:

1. An automotive navigation system comprising: a running distance detecting means for detecting the running distance of a vehicle; a vehicle heading detecting means for detecting the heading of the vehicle; a display means for enabling a planar display based on the two dimensional Cartesian coordinates system; a storage means for storing information comprising a geographical name and the positional information thereof for each of a plurality of points; and a control means for designating the geographical names of a departure point and a destination point, reading out the positional information from said storage means of the designated geographical names, receiving signals from said running distance sensor and said heading sensor, computing the current position of the vehicle on the basis of said signals, computing coordinates on said display means of marks indicative of said departure point, said destination point, and the current position of the vehicle on the basis of their mutual positional relationship and in a reduced scale determined by said departure point, destination point, and the current position of the vehicle so that said marks do not deviate from said display means while the vehicle is being driven, and causing said display means to display said marks indicative of said departure point, said destination point, and the current position of the vehicle in said reduced scale at said corresponding computed coordinates.

2. An automotive navigation system according to claim 1 wherein said control means comprises:
   a current position computing means for computing the current position of the vehicle from the running distance detected by said running distance detecting means and the vehicle heading detected by said vehicle heading detecting means;
   a current position initializing means for initializing the current position of the vehicle for said current position computing means;
   a point setting means for entering the geographical names of said departure point and said destination point of the vehicle, for retrieving said geographical names from said storage means, for reading out the positional information corresponding to said geographical names, and for setting said positional information as the positions of said points; and
   a mark displaying control means for determining the distance and the positional relationship between said departure and destination points from the positional information of both points set by said point setting means, for computing coordinates on said display means of said marks indicative of said departure point, said destination point, and the current position of the vehicle on the basis of the mutual positional relationship and said reduced scale, and for causing said display means to display said marks respectively indicative of the positions of said departure and destination points and the current position of the vehicle at said coordinates on said display means.

3. An automotive navigation system according to claim 2 wherein said mark displaying control means includes means for causing said display means to display the marks of said departure point and said destination point on the outer peripherry of a rectangular zone as imaginarily provided on the screen of said display means.

4. An automotive navigation system according to claim 3 wherein said mark displaying control means comprises means for determining the distance and the positional relationship between said departure and destination points from the positional information of both points set by said point setting means, means for computing coordinates on said display means of marks indicative of said departure point, said destination point, and the current position of the vehicle on the basis of the mutual positional relationship and said reduced scale, said computing means including means for determining the maximum and minimum values of the positional information of the departure and destination points and the current position of the vehicle, determining the middle point between said maximum and minimum values, and converting the positional information and the current position to the coordinate system so the said display means displays two of said marks on the outer periphery of said rectangular zone and displays the remaining one of said marks within said rectangular zone and means for causing said display means to display said marks respectively representative of the positions of said departure and destination points and the current position of the vehicle.

5. An automotive navigation system according to claim 4 wherein said converting means comprises means for determining the reduced scale by comparing the ratio of a lateral length of said predetermined zone to the difference between a first set of maximum and minimum values with the ratio a longitudinal length of said predetermined zone to the difference between a second set of maximum and minimum values.

6. An automotive navigation system according to claim 5 wherein said positional information of each of said plurality of points comprises information representative of the Longitude and the Latitude of said point.

* * * * *